O. RUNDBERG.
RAKE ATTACHMENT.
APPLICATION FILED OCT. 14, 1919.
1,352,386. Patented Sept. 7, 1920.
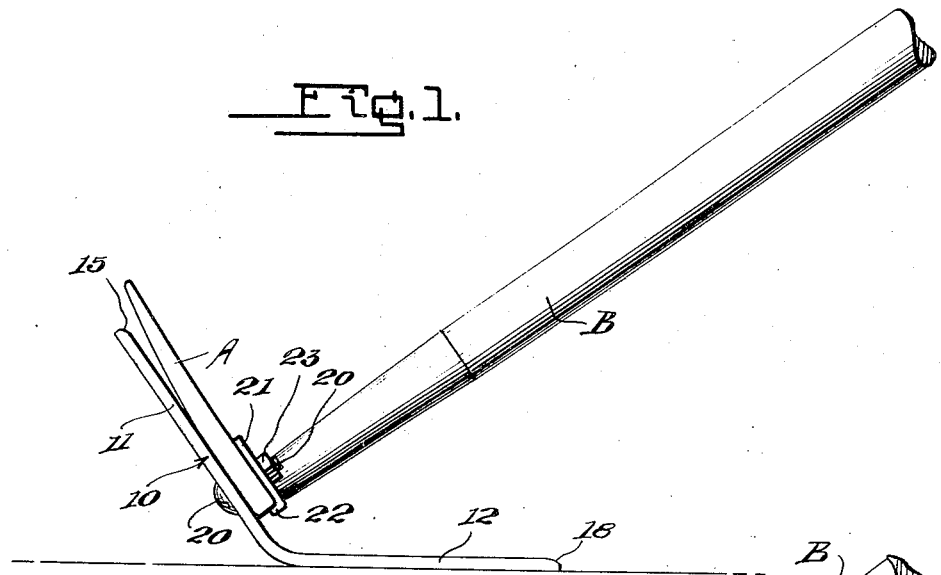
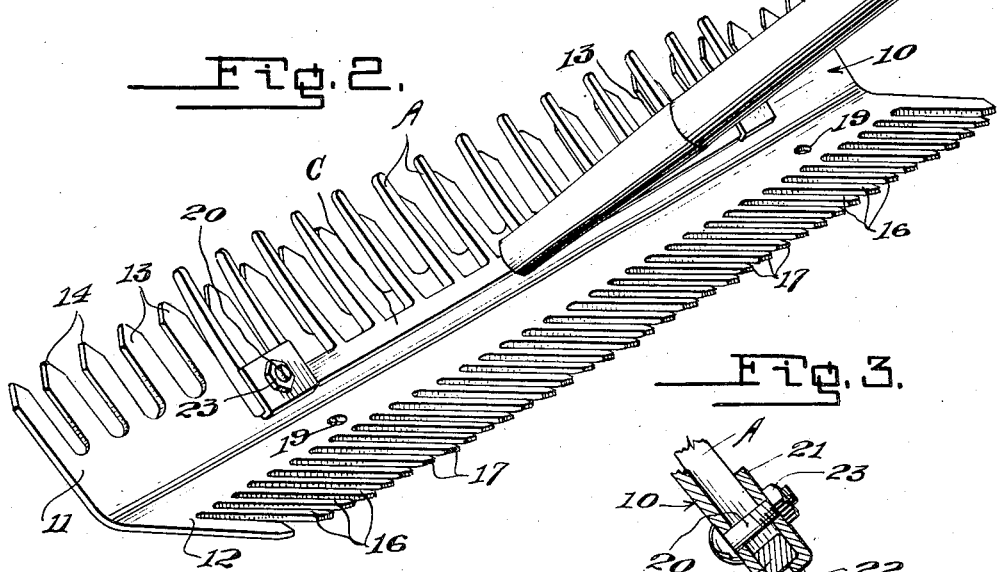
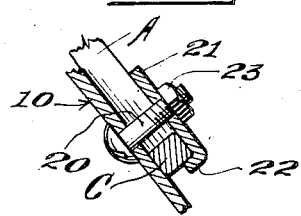
Otto Rundberg, Inventor

UNITED STATES PATENT OFFICE.

OTTO RUNDBERG, OF SPOKANE, WASHINGTON.

RAKE ATTACHMENT.

1,352,386.  Specification of Letters Patent.  Patented Sept. 7, 1920.

Application filed October 14, 1919. Serial No. 330,610.

*To all whom it may concern:*

Be it known that I, OTTO RUNDBERG, a citizen of the United States, residing at Spokane, in the county of Spokane and State of Washington, have invented certain new and useful Improvements in Rake Attachments, of which the following is a specification.

This invention relates to an attachment for garden rakes, and an object of the invention is to provide a blade, which has a pair of toothed portions disposed at oblique angles with respect to each other, and which plate is relatively flat having the teeth along one edge thereof positioned in closer relation to each other than the teeth along the opposite edge, and also to provide means for detachably connecting the blade to an ordinary garden rake, so as to position either the edge with the narrow or wide teeth in an operative position, and at an acute angle to the handle of the rake to which the attachment is connected so that this portion of the attachment which is in operative position may be drawn flatly over the ground for engagement beneath the leaves of dandelion, plantain, or analogous weeds, which infest lawns, for the purpose of pulling these weeds or breaking the top portions thereof from the roots preventing the weeds from seeding and consequently multiplying in successive seasons, thereby permitting the elimination of the weed from a lawn.

Other objects of the invention will appear in the following detailed description taken in connection with the accompanying drawing, forming a part of this specification and in which drawing:

Figure 1 is a side elevation of the improved attachment showing it applied to a rake.

Fig. 2 is a perspective view of the attachment applied to a rake, and

Fig. 3 is a detail sectional view illustrating the manner of attaching the improved weed exterminating attachment to an ordinary garden rake.

Referring more particularly to the drawings, the improved weed exterminating attachment for rakes is formed of a plate 10 of steel or analogous sheet metal, and it is bent intermediate its longitudinal edges to provide portions 11 and 12 positioned at oblique angles to each other. The portion 11 is provided with a plurality of teeth 13, and extending inwardly from the outer edge, which teeth are pointed at their outer ends as shown at 14, and they present perfectly flat surfaces to the outer side or surface of the plate while their upper corners are rounded off as illustrated at 15 in Fig. 1 of the drawings. The teeth 16, which are formed upon the section 12 of the plate 10 are narrow and placed closer together than the teeth 13 as clearly shown in Fig. 2 of the drawings, and these teeth also have their outer ends pointed as shown at 17, having perfectly flat surfaces at their outer surfaces and preferably having upper surfaces slightly angled or beveled at their points as shown at 18 in Fig. 1 of the drawings. The dandelion, plantain or analogous weeds are of various sizes, depending upon their age, and other conditions, such as the fertility of the soil in which they grow, so that it is desirable to provide the two different sized sets of teeth on the weed pulling attachment for rakes, so as to permit the use of the proper sized teeth to effectively remove the weeds. The teeth will have practically no effect upon the grass, in that the blades of the grass will slip between the teeth and underneath the portion of the plate inwardly of the teeth thereby preventing any injury to the grass, while the weeds will be engaged, beneath their leaves and preferably about the roots or their stems, directly above the roots and at the surface of the ground between the teeth, and as the rake is drawn over the lawn, the weeds will be broken off. The weeds as they are broken off will remain between the teeth 16 or upon the flat portion of the plate and when the teeth become clogged so as to impair the operation of the improved rake attachment, the teeth will be cleaned by a slight backward movement of the rake, leaving the weeds in windrows, or piles upon the lawn.

The plate 10 is provided with a plurality of openings 19, arranged in pairs, a pair of which is formed of each of the oblique portions 11 and 12, and these openings are adapted to receive bolts 20 therethrough for clamping the rake attachment 10 to the head A of an ordinary garden rake, which comprises the head A and the handle B. In attaching the rake attachment 10 to the rake head A, when it is desired to use the relatively narrow teeth 16, the bolts 20 are inserted through the openings 19 in the portion 11 of the plate, and they also extend through openings formed in the clamping plate 21, which clamping plates are provided with angled or downturned portions 22, along their lower edges, which engage over the back seat C of the rake head A, while the bolts 20 engage between the outermost teeth of each end of the rake 10. Nuts 23 are threaded upon the bolts 20 for securely clamping the plates 10 and the clamping plates 21 in engagement with the head A of the rake to securely attach the weed cutting attachment 10 to the rake edge, so as to permit the side or portion thereof which is positioned at an acute angle to the handle C of the rake to be drawn flatly over the ground as illustrated in Fig. 1 of the drawings, for breaking off and destroying weeds. When it is desired to use the relatively wide teeth 13, the bolts 20 are inserted through the openings 19, in the angled sections 12 of the plate 10.

Changes in details may be made without departing from the spirit of this invention, but;

I claim:—

1. A weeding attachment for rakes comprising a plate provided with teeth along each edge thereof, said plate bent intermediate its ends to provide obliquely disposed portions, and means for attaching said plate to an ordinary rake whereby one of the tooth portions will extend at an acute angle to the handle of the rake.

2. In a weeding attachment for rakes, a plate being bent intermediate its longitudinal edges to present a pair of obliquely disposed portions, teeth formed upon each of said portions, the teeth upon one portion being smaller and closer together, than the teeth along the longitudinal edge of the other portion, means for attaching said plate to the head of an ordinary rake in such manner that one of said angled teeth side thereof will extend at an acute angle to the handle of the rake.

3. As a new article of manufacture, a weeding attachment for rakes comprising a plate bent intermediate its longitudinal edges to provide a pair of obliquely angled portions, each of said portions provided with longitudinally spaced teeth along its longitudinal outer edge, the teeth upon one of said sections being larger and spaced farther apart than the teeth upon the other section.

4. As a new article of manufacture, a weeding attachment for rakes comprising a plate bent intermediate its longitudinal edges to provide a pair of obliquely angled portions, each of said portions provided with longitudinally spaced teeth along its longitudinal outer edge, the teeth upon one of said sections being larger and spaced farther apart than the teeth upon the other section, said teeth extending inwardly from the outer edges of the oblique portions for the major portion of their width.

5. In a weeding attachment for rakes, the combination of a plate bent intermediate its longitudinal edges to provide obliquely angled portions, each of said portions provided with teeth along its outer edge, the teeth along the outer edge of one of said obliquely angled portions being larger than the teeth upon the other edge, each of said obliquely angled portions provided with a plurality of openings, bolts adapted to extend through the openings in either of said obliquely angled portions, and clamping plates upon said bolts for co-action with the plates and bolts to securely clamp the weeding attachment upon the rake head.

6. In a weeding attachment for rakes, the combination of a plate bent intermediate its longitudinal edges to provide obliquely angled portions, each of said portions provided with teeth along its outer edge, the teeth along the outer edge of one of said obliquely angled portions being larger than the teeth upon the other edge, each of said obliquely angled portions provided with a plurality of openings, bolts adapted to extend through the openings in either of said obliquely angled portions, clamping plates upon said bolts for co-action with the plates and bolts to securely clamp the weeding attachment upon the rake head, with one of said obliquely angled portions extending at an acute angle to the handle of the rake and being adapted to be drawn flatly over the surface.

OTTO RUNDBERG.